US010736188B2

(12) United States Patent
Gotou et al.

(10) Patent No.: US 10,736,188 B2
(45) Date of Patent: Aug. 4, 2020

(54) LIGHTING CONTROL DEVICE (71) Applicant: Panasonic Intellectual Property Management Co., Ltd., Osaka (JP)

(72) Inventors: Kiyosi Gotou, Hyogo (JP); Eiichirou Niikura, Mie (JP); Kengo Miyamoto, Osaka (JP); Tomohiro Miyake, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 95 days.

(21) Appl. No.: 15/757,353

(22) PCT Filed: Sep. 2, 2016

(86) PCT No.: PCT/JP2016/004016
§ 371 (c)(1),
(2) Date: Mar. 3, 2018

(87) PCT Pub. No.: WO2017/043061
PCT Pub. Date: Mar. 16, 2017

(65) Prior Publication Data
US 2018/0242417 A1 Aug. 23, 2018

(30) Foreign Application Priority Data
Sep. 10, 2015 (JP) .................. 2015-178868

(51) Int. Cl.
*H02J 7/00* (2006.01)
*H05B 45/10* (2020.01)
(Continued)

(52) U.S. Cl.
CPC ............ *H05B 45/10* (2020.01); *H02J 7/0068* (2013.01); *H05B 45/37* (2020.01); *H05B 47/175* (2020.01); *H02J 7/345* (2013.01)

(58) Field of Classification Search
CPC ................ H05B 33/08; H05B 33/0845; H05B 33/0815; H05B 37/02; H05B 37/0227;
(Continued)

(56) References Cited

U.S. PATENT DOCUMENTS

2003/0043027 A1* 3/2003 Carson ..................... H04B 3/54
375/259
2008/0265685 A1* 10/2008 Blair ........................ H05B 47/19
307/141
(Continued)

FOREIGN PATENT DOCUMENTS

CN 107683631 A 2/2018
CN 107950079 A 4/2018
(Continued)

OTHER PUBLICATIONS

International Search Report and Written Opinion for corresponding International Application No. PCT/JP2016/004016, dated Nov. 22, 2016.

*Primary Examiner* — Rexford N Barnie
*Assistant Examiner* — Jagdeep S Dhillon
(74) *Attorney, Agent, or Firm* — Renner, Otto, Boisselle & Sklar, LLP (57) ABSTRACT

A power supply is electrically connected between a pair of input terminals and is configured to be supplied with electric power from an AC power supply to generate control electric power. A voltage detector is configured to detect a voltage of the control electric power. A controller is configured to be supplied with the control electric power from the power supply to operate. The controller is configured to control a bidirectional switch based on a detection signal from a phase detector so as to switch the bidirectional switch from an ON state to an OFF state at a switching time point when a variable time corresponding to a dimming level elapses from a starting point of a half period of an AC voltage. A stopper (Continued)

is configured to halt generation of the control electric power by the power supply when the voltage detected by the voltage detector is higher than or equal to a prescribed threshold during an OFF time period from the switching time point to an end time point of the half period.

10 Claims, 6 Drawing Sheets

(51) Int. Cl.
    *H05B 45/37* (2020.01)
    *H05B 47/175* (2020.01)
    *H02J 7/34* (2006.01)

(58) Field of Classification Search
    CPC ...... H05B 37/0272; H02J 7/00; H02J 7/0068; H02J 3/14; H02M 1/36; H02M 7/06; H02M 11/04
    USPC ............ 307/20, 39, 66, 64, 80, 82; 315/205, 315/224, 246, 309; 363/49, 126; 340/310.1, 310.03, 538
    See application file for complete search history.

(56) References Cited

U.S. PATENT DOCUMENTS

| | | | | |
|---|---|---|---|---|
| 2010/0259196 | A1* | 10/2010 | Sadwick | H03K 17/72 315/309 |
| 2011/0121654 | A1* | 5/2011 | Recker | H02J 7/0068 307/66 |
| 2011/0121752 | A1* | 5/2011 | Newman, Jr. | H05B 45/10 315/291 |
| 2011/0157942 | A1* | 6/2011 | Babcock | H02M 1/425 363/126 |
| 2012/0068611 | A1* | 3/2012 | Steiner | H05B 47/19 315/155 |
| 2012/0153930 | A1 | 6/2012 | Goto | |
| 2012/0256553 | A1* | 10/2012 | Chen | H05B 45/10 315/205 |
| 2013/0187563 | A1* | 7/2013 | Sasai | H05B 45/37 315/287 |
| 2013/0242625 | A1* | 9/2013 | Yan | H05B 45/14 363/49 |
| 2014/0077718 | A1* | 3/2014 | Zotter | H05B 39/08 315/224 |
| 2014/0189387 | A1* | 7/2014 | Vilhauer | G06F 1/3234 713/320 |
| 2015/0163874 | A1* | 6/2015 | Roberts | H05B 45/37 315/200 R |
| 2016/0095187 | A1* | 3/2016 | Chen | H05B 39/044 315/155 |
| 2018/0153021 | A1 | 5/2018 | Gotou | |
| 2018/0235048 | A1 | 8/2018 | Gotou | |

FOREIGN PATENT DOCUMENTS

| | | |
|---|---|---|
| JP | 2011-050149 A | 3/2011 |
| JP | 2013-004350 A | 1/2013 |
| JP | 2013-149498 A | 8/2013 |

\* cited by examiner

LIGHTING CONTROL DEVICE

TECHNICAL FIELD

The present invention relates to a lighting control device for dimming an illumination load.

BACKGROUND ART

A lighting control device for dimming an illumination load is known (e.g., Patent Literature 1).

The lighting control device described in Patent Literature 1 includes a pair of terminals, a control circuit, a control power supply configured to supply control electric power to the control circuit, and a dimming manipulation section configured to set the dimming level of the illumination load.

Between the pair of terminals, the control circuit and the control power supply are connected in parallel to each other. Moreover, between the pair of terminals, a series circuit of an alternating current (AC) power supply and an illumination load is connected. The illumination load includes a plurality of light emitting diode (LED) devices and a power supply circuit configured to light the LED devices. The power supply circuit includes a smoothing circuit of a diode and an electrolytic capacitor.

The control circuit includes a switch which enables phase control of an AC voltage to be supplied to the illumination load, a switch driver configured to drive the switch, and a controller configured to control the switch driver and the control power supply.

The control power supply is connected in parallel to the switch. The control power supply converts the AC voltage of the AC power supply into control electric power. The control power supply includes an electrolytic capacitor configured to store the control electric power.

The controller is supplied with the control electric power from the control power supply via the electrolytic capacitor. The controller includes a microcomputer. The microcomputer performs reverse phase control in accordance with a dimming level set by the dimming manipulation section to interrupt power supply to the illumination load during a time period of each of half cycles of the AC voltage.

CITATION LIST

Patent Literature

Patent Literature 1: JP 2013-149498 A

SUMMARY OF INVENTION

It is an object of the present invention to provide a lighting control device which is compatible with an increased number of types of illumination loads.

A lighting control device according to one aspect of the present invention includes a pair of input terminals, a bidirectional switch, a phase detector, an inputter, a power supply, a voltage detector, a controller, and a stopper. The pair of input terminals is electrically connected between an illumination load and an AC power supply. The bidirectional switch is configured to switch between conduction and non-conduction of a bidirectional current between the pair of input terminals. The phase detector is configured to detect a phase of an AC voltage of the AC power supply. The inputter is configured to receive a dimming level specifying a magnitude of a light output of the illumination load. The power supply is electrically connected between the pair of input terminals and is configured to be supplied with electric power from the AC power supply to generate control electric power. The voltage detector is configured to detect a voltage of the control electric power. The controller is configured to be supplied with the control electric power from the power supply to operate and to control the bidirectional switch based on a detection signal from the phase detector so as to switch the bidirectional switch from an ON state to an OFF state at a switching time point when a variable time corresponding to the dimming level elapses from a starting point of a half period of the AC voltage. The stopper is configured to halt generation of the control electric power by the power supply when the voltage detected by the voltage detector is higher than or equal to a prescribed threshold during an OFF time period from the switching time point to an end time point of the half period.

DESCRIPTION OF EMBODIMENTS

The following configurations are mere examples of the present invention. The present invention is not limited to the following embodiments. Even in embodiments other than these embodiments, various modifications may be made depending on design and the like without departing from the technical idea of the present invention.

First Embodiment (1.1) Configuration

Figure 1:
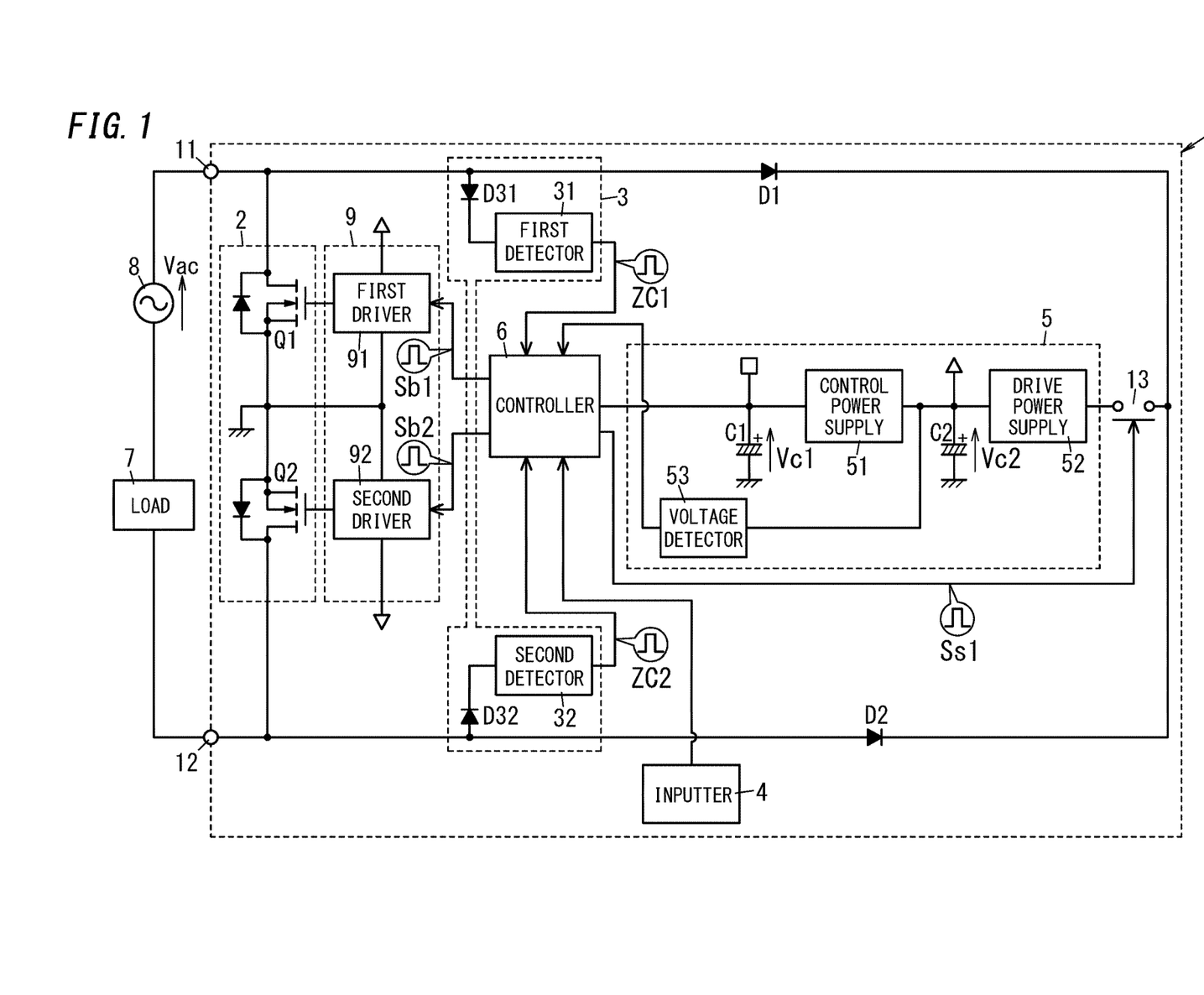
FIG. 1 is a circuit diagram schematically illustrating a configuration of a lighting control device according to a first embodiment.

As illustrated in FIG. 1, a lighting control device 1 of a first embodiment includes a pair of input terminals 11 and 12, a bidirectional switch 2, a phase detector 3, an inputter 4, a power supply 5, a controller 6, a switch driver 9, diodes D1 and D2, and a stopper 13. The power supply 5 includes a voltage detector 53. The "input terminal" mentioned herein may not have an entity as a part (terminal) to which an electric wire or the like is to be connected, but the "input terminal" may be, for example, a lead of an electronic component, or a part of a conductor included in a circuit board.

The lighting control device 1 is a two-wire lighting control device and is used electrically connected in series to an illumination load (hereinafter referred to simply as "load") 7 with respect to an AC power supply 8. The load 7 is lit when supplied with electric power. The load 7 includes an LED device as a light source and a lighting circuit configured to light the LED device. The AC power supply 8 is, for example, a commercial power supply having a single phase 100 V and 60 Hz. The lighting control device 1 is applicable to, for example, a wall switch.

The bidirectional switch 2 includes, for example, two devices, namely a first switching device Q1 and a second switching device Q2 electrically connected in series between the input terminals 11 and 12. For example, each of the switching devices Q1 and Q2 is a semiconductor switching device including an enhancement n-channel metal-oxide-semiconductor field effect transistor (MOSFET).

The switching devices Q1 and Q2 are connected in a so-called anti-series connection between the input terminals 11 and 12. That is, the sources of the switching devices Q1 and Q2 are connected to each other. The drain of the switching device Q1 is connected to the input terminal 11, and the drain of the switching device Q2 is connected to the input terminal 12. The sources of both of the switching devices Q1 and Q2 are connected to ground of the power supply 5. The ground of the power supply 5 corresponds to a reference potential for an internal circuit of the lighting control device 1.

The bidirectional switch 2 is capable of switching among four states by a combination of on and off of the switching devices Q1 and Q2. The four states include a bidirectionally off state where both the switching devices Q1 and Q2 are off, a bidirectionally on state where both the switching devices Q1 and Q2 are on, and two kinds of unidirectionally on states: a case where only the switching device Q1 is on and a case where only the switching device Q2 is on. In a unidirectionally on state, unidirectional conduction is established between the pair of input terminals 11 and 12, from one of the switching devices Q1 and Q2 which is on, through a parasitic diode of the other of the switching devices Q1 and Q2 which is off. For example, when the switching device Q1 is on and the switching device Q2 is off, a first unidirectionally on state where a current flows from the input terminal 11 toward the input terminal 12 is achieved. Alternatively, when the switching device Q2 is on and the switching device Q1 is off, a second unidirectionally on state where a current flows from the input terminal 12 toward the input terminal 11 is achieved. Thus, when an AC voltage Vac is applied from the AC power supply 8 between the input terminals 11 and 12, in a positive polarity of the AC voltage Vac, that is, in a half period in which the input terminal 11 has a high potential, the first unidirectionally on state is a forward on state, and the second unidirectionally on state is a reverse on state. On the other hand, in a negative polarity of the AC voltage Vac, that is, in a half period in which the input terminal 12 has the high potential, the second unidirectionally on state is the forward on state, and the first unidirectionally on state is the reverse on state.

Here, the bidirectional switch 2 is in an on state in both the bidirectionally on state and the forward on state, and is in an off state in both the bidirectionally off state and the reverse on state.

The phase detector 3 detects the phase of the AC voltage Vac applied between the input terminals 11 and 12. The "phase" mentioned herein includes a zero crossing point of the AC voltage Vac and the polarity (positive polarity, negative polarity) of the AC voltage Vac. The phase detector 3 is configured to output a detection signal to the controller 6 when the phase detector 3 detects the zero crossing point of the AC voltage Vac. The phase detector 3 includes a diode D31, a first detector 31, a diode D32, and a second detector 32. The first detector 31 is electrically connected to the input terminal 11 via the diode D31. The second detector 32 is electrically connected to the input terminal 12 via the diode D32. The first detector 31 detects a zero crossing point when the AC voltage Vac transitions from a negative half period to a positive half period. The second detector 32 detects a zero crossing point when the AC voltage Vac transitions from the positive half period to the negative half period.

That is, the first detector 31 determines the zero crossing point when detecting a transition from a state where a voltage with the input terminal 11 having a high electric potential is lower than a specified value to a state where the voltage with the input terminal 11 having the high electric potential is higher than or equal to the specified value. The first detector 31 outputs a first detection signal ZC1 to the controller 6 when detecting the transition. Similarly, the second detector 32 determines the zero crossing point when detecting a transition from a state where a voltage with the input terminal 12 having a high electric potential is lower than a specified value to a state where the voltage with the input terminal 12 having a high electric potential is higher than or equal to the specified value. The second detector 32 outputs a second detection signal ZC2 to the controller 6 when detecting the transition. The specified value is a value (an absolute value) set close to 0 V. For example, the specified value of the first detector 31 is a value about several volts, and the specified value of the second detector 32 is a value about several volts. Thus, detection points at which the zero crossing points are detected by the first detector 31 and the second detector 32 are a little later than the zero crossing points (0 V) in a strict sense.

The inputter 4 receives a signal denoting the dimming level from a manipulation section manipulated by a user and outputs the signal as a dimming signal to the controller 6. The inputter 4 may process the received signal or does not have to process the received signal to output the dimming signal. The dimming signal corresponds to a numerical value or the like specifying the magnitude of the light output of the load 7 and may include an off level at which the load 7 is in a non-lighting state. The manipulation section is only required to be configured to be manipulated by a user to output a signal denoting the dimming level to the inputter 4. The manipulation section may be, for example, a variable resistor, a rotary switch, a touch panel, a remote controller, or a communication terminal such as a smartphone.

The controller 6 controls the bidirectional switch 2 on the basis of the detection signals from the phase detector 3 and the dimming signal from the inputter 4. The controller 6 individually controls the switching devices Q1 and Q2. Specifically, the controller 6 controls the switching device Q1 by a first control signal Sb1 and controls the switching device Q2 by a second control signal Sb2.

The controller 6 includes, for example, a microcomputer as a main configuration. The microcomputer executes a program stored in memory of the microcomputer by a central processing unit (CPU) to realize a function as the controller 6. The program may be stored in the memory of the microcomputer in advance, may be provided as a recording medium such as a memory card storing the program, or may be provided via an electronic communication network. In other words, the program is a program which causes a computer (in this embodiment the microcomputer) to function as the controller 6.

The switch driver 9 includes a first driver 91 configured to drive (perform on/off control of) the switching device Q1 and a second driver 92 configured to drive (perform on/off control of) the switching device Q2. The first driver 91 receives the first control signal Sb1 from the controller 6 to apply a gate voltage to the switching device Q1. In this way, the first driver 91 performs the on/off control of the switching device Q1. Similarly, the second driver 92 receives the second control signal Sb2 from the controller 6 to apply a gate voltage to the switching device Q2. In this way, the second driver 92 performs the on/off control of the switching device Q2. The first driver 91 generates the gate voltage with reference to the potential of the source of the switching device Q1. The same applies to the second driver 92.

The power supply 5 includes a control power supply 51 configured to generate control electric power, a drive power supply 52 configured to generate drive electric power, and the voltage detector 53. The power supply 5 further includes capacitive elements (capacitors) C1 and C2. The control electric power is power by which the controller 6 is operated. The drive electric power is power by which the switch driver 9 is driven. The capacitive element C1 is electrically connected to an output terminal of the control power supply 51 and is charged with an output current of the control power supply 51. The capacitive element C2 is electrically connected to an output terminal of the drive power supply 52 and is charged with an output current of the drive power supply 52.

The power supply 5 is electrically connected to the input terminal 11 via the diode D1 and is electrically connected to the input terminal 12 via the diode D2. Thus, a diode bridge including the diodes D1 and D2 and parasitic diodes of the switching devices Q1 and Q2 performs full-wave rectification of the AC voltage Vac applied between the input terminals 11 and 12, and the full-wave rectified AC voltage Vac is then supplied to the power supply 5. Thus, when the bidirectional switch 2 is in the off state, the full-wave rectified AC voltage Vac (a pulsating voltage output from the diode bridge) is to be applied to the power supply 5.

The full wave-rectified AC voltage Vac is applied to the drive power supply 52, and the drive power supply 52 thereby generates drive electric power which is a constant voltage and outputs the drive electric power to the capacitive element C2. The drive power supply 52 supplies the drive electric power to the switch driver 9 and the control power supply 51. The drive electric power is, for example, 10 V. The control power supply 51 steps down the drive electric power supplied from the drive power supply 52 to generate control electric power and outputs the control electric power to the capacitive element C1. The control electric power is, for example, 3 V. The control power supply 51 may generate the control electric power directly from the full-wave rectified AC voltage Vac but not via the drive power supply 52. That is, the power supply 5 generates the control electric power and the drive electric power from the electric power supplied from the AC power supply 8.

The voltage detector 53 detects a voltage Vc2 (across) of the capacitive element C2 of the power supply 5 as the voltage of the control electric power. The voltage detector 53 is, for example, a voltage dividing resistor connected between both ends of the capacitive element C2 and outputs, as a detection value, a voltage corresponding to the voltage Vc2 of the capacitive element C2 to the controller 6. That is, the voltage detector 53 indirectly detects the voltage of the control electric power by detecting the voltage Vc2 of the capacitive element C2. In the following description, the detection value of the voltage detector 53 is equal to the voltage Vc2 of the capacitive element C2. Note that the configuration of the voltage detector 53 is not limited to the above-described configuration. The voltage detector 53 may be configured to directly detect the voltage of the control electric power by detecting, for example, a voltage Vc1 (across) of the capacitive element C1.

The controller 6 compares the detection value (the voltage Vc2 of the capacitive element C2) of a voltage detector 53 with a prescribed threshold Vth1 (see FIG. 2) in an off-time period from a switching time point (a time point at which the bidirectional switch 2 is switched from the on state to the off state) to an end time point of the half period of the AC voltage Vac. When the detection value (the voltage Vc2) is larger than or equal to the threshold Vth1, an interruption signal Ss1 to be output to the stopper 13 is switched from an ON signal to an OFF signal. In this embodiment, the threshold Vth1 is a voltage across the capacitive element C2 when the capacitive element C2 is charged to such an extent that operation of the controller 6 can be secured at least until a next switching time point. Specifically, a value obtained by adding a prescribed margin to a minimum value V min is used as the threshold Vth1 so that the voltage Vc2 of the capacitive element C2 does not decrease below the minimum value V min (see FIG. 2) in any dimming level. "Minimum value V min" mentioned herein denotes a minimum value of the voltage Vc2 required for normal operation of the controller 6.

While the interruption signal Ss1 input from the controller 6 is the OFF signal (e.g., at a low level), the stopper 13 halts generation of the drive electric power by the drive power supply 52 of the power supply 5, thereby indirectly stopping generation of the control electric power by the control power supply 51. That is, since the control power supply 51 generates the control electric power from the drive electric power generated by the drive power supply 52, when the generation of the drive electric power by the drive power supply 52 is stopped, the generation of the control electric power by the control power supply 51 is stopped. Note that the control power supply 51 does not stop generating the control electric power immediately after the interruption signal Ss1 transitions to the OFF signal, but the control power supply 51 can continue generating the control electric power for a while by an electric charge accumulated in the capacitive element C2 while the interruption signal Ss1 is the ON signal (e.g., at a high level). In the present embodiment, the stopper 13 electrically interrupts the power supply 5 or controls a semiconductor switching device included in the power supply 5 to halt the generation of the drive electric power by the drive power supply 52 of the power supply 5. In the example of FIG. 1, the stopper 13 and the power supply 5 form a series circuit. The series circuit of the stopper 13 and the power supply 5 is electrically connected in parallel to the bidirectional switch 2 via the diode bridge between the pair of input terminals 11 and 12.

Specifically, the stopper 13 is a switch electrically connected between the power supply 5 and a connection point of the pair of diodes D1 and D2 and is configured to receive the interruption signal Ss1 from the controller 6 to be turned on/off. When the interruption signal Ss1 is the ON signal, the stopper 13 is turned on and electrically connects the power supply 5 to the input terminals 11 and 12. On the other hand, when the interruption signal Ss1 is the OFF signal, the stopper 13 is turned off and electrically disconnects the power supply 5 from the input terminals 11 and 12.

The lighting circuit of the load 7 reads a dimming level from the waveform of the AC voltage Vac phase-controlled by the lighting control device 1 to vary the magnitude of the light output of the LED device. Here, the lighting circuit includes, for example, a circuit for securing a current such as a bleeder circuit. Thus, also during a time period during which the bidirectional switch 2 of the lighting control device 1 is non-conductive, a current is allowed to pass through the load 7.

(1.2) Operation (1.2.1) Activation Operation

First, activation operation when conduction of the lighting control device 1 of the present embodiment is started will be described.

In the lighting control device 1 having the above-described configuration, when the AC power supply 8 is connected between the input terminals 11 and 12 via the load 7, the AC voltage Vac applied between the input terminals 11 and 12 from the AC power supply 8 is rectified and is then supplied to the drive power supply 52. The drive electric power generated by the drive power supply 52 is supplied to the switch driver 9 and the control power supply 51. When the control electric power generated by the control power supply 51 is supplied to the controller 6, the controller 6 is activated.

When the controller 6 is activated, the controller 6 determines the frequency of the AC power supply 8 on the basis of a detection signal of the phase detector 3. Then, on the basis of the frequency determined by the controller 6, the controller 6 refers to a numerical value table stored in memory in advance to set various types of parameters such as a time. Here, if the dimming level input to the inputter 4 is the off level, the controller 6 maintains the bidirectional switch 2 in the bidirectionally off state to keep the impedance between the pair of input terminals 11 and 12 in a high impedance state. Thus, the load 7 keeps a non-lighting state.

(1.2.2) Dimming Operation

Figure 2:
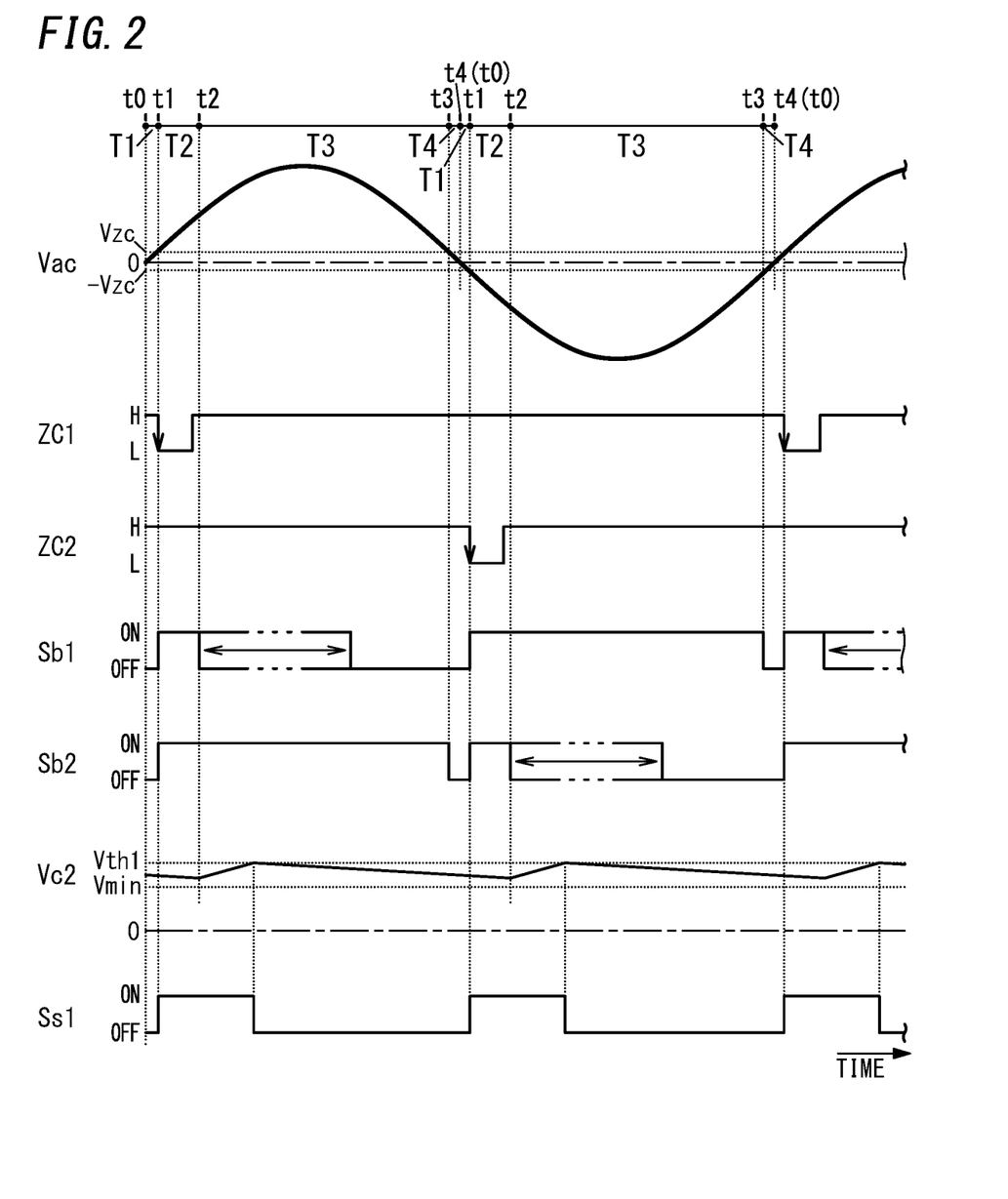
FIG. 2 is a timing chart illustrating operation of the lighting control device according to the first embodiment.

Next, dimming operation of the lighting control device 1 of the present embodiment will be described with reference to FIG. 2. FIG. 2 shows the AC voltage Vac, the first detection signal ZC1, the second detection signal ZC2, the first control signal Sb1, the second control signal Sb2, the voltage Vc2 of the capacitive element C2, and the interruption signal Ss1.

In the present embodiment, transition of the first detection signal ZC1 from a high level to a low level means generation of the first detection signal ZC1. Moreover, transition of the second detection signal ZC2 from the high level to the low level means generation of the second detection signal ZC2. That is, the first detection signal ZC1 and the second detection signal ZC2 are signals which transition from the high level to the low level when the zero crossing point is detected. The voltage Vc2 of the capacitive element C2 and the interruption signal Ss1 will be described in "(1.2.3) Generation Operation of Control Electric Power".

First, the operation of the lighting control device 1 during a positive half period of the AC voltage Vac is described. The lighting control device 1 detects the zero crossing point of the AC voltage Vac by the phase detector 3. The zero crossing point serves as a reference for phase control. The first detector 31 outputs the first detection signal ZC1 when the AC voltage Vac reaches a positive specified value Vzc in the course of a transition of the AC voltage Vac from a negative half period to the positive half period. In the present embodiment, a generation time point of the first detection signal ZC1 is defined as a first time point t1, and a time period from a starting point (zero crossing point) t0 to the first time point t1 of the positive half period is defined as a first time period T1. During the first time period T1 from the starting point t0 to a first time point t1 of the half period, the controller 6 retains the first control signal Sb1 and the second control signal Sb2 as OFF signals. Thus, during the first time period T1, both the switching devices Q1 and Q2 are off, and the bidirectional switch 2 is in the bidirectionally off state. At the first time point t1, the controller 6 sets the first control signal Sb1 and the second control signal Sb2 to ON signals.

A second time point t2 is a time point when the on time having a length according to the dimming signal elapses from the first time point t1. At the second time point t2, the controller 6 keeps the second control signal Sb2 set to the ON signal and sets the first control signal Sb1 to an OFF signal. In this way, during a second time period T2 from the first time point t1 to the second time point t2, both the switching devices Q1 and Q2 are on, and the bidirectional switch 2 is in the bidirectionally on state. Thus, during the second time period T2, electric power is supplied from the AC power supply 8 via the bidirectional switch 2 to the load 7, and the load 7 therefore emits light.

A third time point t3 is a time point earlier than an end time point (a zero crossing point) t4 of the half period by a definite time (e.g., 300 μs). That is, when it is assumed that the end time point t4 is a time point at which a time obtained by subtracting the first time period T1 from a time corresponding to the half period has elapsed since the first time point t1 serving as the generation time point of the first detection signal ZC1, the third time point t3 is a time point earlier than the end time point t4 by a definite time period. Note that in the timing chart of FIG. 2, the third time point t3 is illustrated to coincide with a timing at which the AC voltage Vac reaches a positive specified value Vzc or a timing at which the AC voltage Vac reaches a negative specified value −Vzc, but the third time point t3 is determined regardless of the timing at which the AC voltage Vac becomes equal to the positive specified value Vzc or the negative specified value −Vzc.

At the third time point t3, the controller 6 sets the first control signal Sb1 and the second control signal Sb2 to OFF signals. In this way, during a third time period T3 from the second time point t2 to the third time point t3, only the switching device Q1 of the switching devices Q1 and Q2 is off, and the bidirectional switch 2 is in the reverse on state. Thus, during the third time period T3, supplying of electric power from the AC power supply 8 to the load 7 is interrupted.

During a fourth time period T4 from the third time point t3 to the end time point (zero crossing point) t4 of the half period, both the switching devices Q1 and Q2 are off, and the bidirectional switch 2 is in the bidirectionally off state.

Moreover, the operation of the lighting control device 1 during the negative half period of the AC voltage Vac is substantially the same as that during the positive half period.

In the negative half period, when the AC voltage Vac reaches the negative specified value −Vzc, the second detector 32 outputs the second detection signal ZC2. In the present embodiment, a first time period T1 is a time period from a starting point t0 (t4) of the negative half period to a first time point t1 which is a generation time point of the second detection signal ZC2. Moreover, the second time point t2 is a time point when the on time having a length according to the dimming signal elapses from the first time point t1. The third time point t3 is a time earlier than the end time point t4 (t0) of the half period by a definite time period (e.g., 300 μs).

During the first time period T1, the controller 6 controls such that the first control signal Sb1 and the second control signal Sb2 are OFF signals. Thus, the bidirectional switch 2 is in the bidirectionally off state during the first time period T1. Then, at the first time point t1, the controller 6 sets the first control signal Sb1 and second control signal Sb2 to the ON signals. In this way, during a second time period T2 from the first time point t1 to the second time point t2, both the switching devices Q1 and Q2 are on, and the bidirectional switch 2 is in the bidirectionally on state. Thus, during the second time period T2, electric power is supplied from the AC power supply 8 via the bidirectional switch 2 to the load 7, and the load 7 therefore emits light.

At the second time point t2, the controller 6 keeps the first control signal Sb1 set to the ON signal and sets the second control signal Sb2 to an OFF signal. At the third time point t3, the controller 6 sets the first control signal Sb1 and the second control signal Sb2 to OFF signals. In this way, during a third time period T3 from the second time point t2 to a third time point t3, only the switching device Q2 of the switching devices Q1 and Q2 is off, and the bidirectional switch 2 is in the reverse on state. Thus, during the third time period T3, supplying of electric power from the AC power supply 8 to the load 7 is interrupted. During the fourth time period T4 from the third time point t3 to the end time point t4 of the half period, both the switching devices Q1 and Q2 are OFF, and the bidirectional switch 2 is in the bidirectionally off state.

The lighting control device 1 of the present embodiment alternately repeats the operation during the positive half period and the operation during the negative half period in every half period of the AC voltage Vac which are described above to dim the load 7. In the present embodiment, since the bidirectionally on state is the on state, and the reverse on state is the off state, a time point at which the bidirectional switch 2 is switched from the bidirectionally on state to the reverse on state, that is, the second time point t2 corresponds to the switching time point. Since the time (the on time) from the first time point t1 to the switching time point (the second time point t2) is a time according to the dimming level input to the inputter 4, a time when the input terminals 11 and 12 are conductive during the half period is to be determined in accordance with the dimming level. Moreover, when the positive specified value Vzc and the negative specified value −Vzc are fixed values, a time from the starting point t0 to the first time point (the generation time point of the first detection signal ZC1 or the second detection signal ZC2) t1 of the half period has a substantially fixed length.

Thus, a variable time, which is defined as a time from the starting point t0 to the switching time point (the second time point t2) of the half period, that is, a sum of the first time period T1 and the on time (the second time period T2) having a length which is variable according to the dimming level, has a length that varies in accordance with the dimming level. In other words, the variable time is a time having a variable length, and the phase of the AC voltage Vac at the switching time point (the second time point t2) varies in accordance with the dimming level. That is, in order to achieve a small light output of the load 7, the variable time is set short, whereas in order to achieve a large light output of the load 7, the variable time is set long. Thus, it is possible to vary the magnitude of the light output of the load 7 in accordance with the dimming level input to the inputter 4.

Moreover, during the latter part of the half period of the AC voltage Vac, specifically, during the time periods (the third time period T3 and the fourth time period T4) from the switching time point (the second time point t2) to the end time point t4 of the half period, the bidirectional switch 2 is in the off state (in the reverse on state or in the bidirectionally off state). In the present embodiment, a time period which is a sum of the third time period T3 and the fourth time period T4 corresponds to the off-time period. The lighting control device 1 can secure supplying electric power from the AC power supply 8 to the power supply 5 during the off-time period. Operation of the power supply 5 will be described in detail in "(1.2.3) Generation operation of Control Electric Power". Moreover, the bidirectional switch 2 is in the off state also during a time period from the starting point (zero crossing point) t0 to the first time point t1 of the half period. Thus, when attention is focused on two consecutive half periods, the bidirectional switch 2 is in the off state from the second time point t2 of the first half period to the first time point t1 of the next half period (i.e., the second half period).

In this embodiment, the expression "from a time point A" includes the time point A. For example, "from a first time point" includes the first time point. On the other hand, the expression "to a time point A" excludes the time point A and means "until immediately before the time point A". For example, "to an end time point of a half period" excludes the end time point of the half period and means "until immediately before the end time point of the half period".

In the present embodiment, since the off-time period is determined with priority given to securement of supplying electric power from the AC power supply 8 to the power supply 5, there may be a case where the second time period T2 for supplying electric power to the load 7 is not determined in accordance with the dimming level input to the inputter 4. For example, even when a user manipulates the manipulation section to obtain a maximum light output of the load 7, priority is given to the setting of the off-time period (the third time period T3 and the fourth time period T4), and the second time period T2 may not be determined as specified by the dimming signal from the inputter.

(1.2.3) Generation Operation of Control Electric Power

Next, generation operation of the control electric power by the power supply 5 will be described with reference to FIG. 2.

In the present embodiment, the power supply 5 is supplied with electric power from the AC power supply 8 to generate the control electric power during the OFF time period (the third time period T3 and the fourth time period T4) from the switching time point (the second time point t2) to the end time point t4 of the half period. Thus, the capacitive element C2 is started to be charged from the switching time point (second time point t2), and the voltage Vc2 of the capacitive element C2 gradually increases.

In this embodiment, the controller 6 sets the interruption signal Ss1 to be output to the stopper 13 to the ON signal at the switching time point (second time point t2) which is the starting point of the OFF time period. During the OFF time period, the controller 6 compares the voltage Vc2 of the capacitive element C2 with the threshold Vth1, and when the voltage Vc2 is higher than or equal to the threshold Vth1, the controller 6 switches the interruption signal Ss1 from the ON signal to the OFF signal. After switching the interruption signal Ss1 to the OFF signal, the controller 6 retains the interruption signal Ss1 as the OFF signal until at least a next first time point (generation time point of the first detection signal ZC1 or the second detection signal ZC2) t1.

While the interruption signal Ss1 is the OFF signal, the stopper 13 electrically disconnects the power supply 5 from the input terminals 11 and 12 to halt the generation of the drive electric power by the drive power supply 52 of the power supply 5, thereby indirectly stopping the generation of the control electric power by the control power supply 51. That is, since the control power supply 51 generates the control electric power from the drive electric power generated by the drive power supply 52, the generation of the control electric power by the control power supply 51 is stopped when the generation of the drive electric power by the drive power supply 52 is stopped. Note that the control power supply 51 does not stop generating the control electric power immediately after the interruption signal Ss1 transitions to the OFF signal, but the control power supply 51 can continue generating the control electric power for a while by an electric charge accumulated in the capacitive element C2 while the interruption signal Ss1 is the ON signal (e.g., at a high level).

Thus, even during the OFF time period, the control electric power is not always generated by application of the AC voltage Vac by the power supply 5, and when or after the capacitive element C2 is charged to a certain extent and the voltage Vc2 of the capacitive element C2 reaches the threshold Vth1, charging of the capacitive element C2 is stopped. When the charging of the capacitive element C2 is stopped, the electric charge accumulated in the capacitive element C2 is indirectly consumed by the controller 6 via the control power supply 51, which gradually reduces the voltage Vc2 of the capacitive element C2. When the voltage Vc2 of the capacitive element C2 decreases to a certain extent, the generation of the control electric power by the control power supply 51 by using the drive electric power generated by the drive power supply 52 is stopped.

In the present embodiment, the controller 6 switches the interruption signal Ss1 to the ON signal when the interruption signal Ss1 is the OFF signal at the first time point (generation time point of first detection signal ZC1 or the second detection signal ZC2) t1. When the interruption signal Ss1 is the ON signal at the first time point t1, the controller 6 retains the interruption signal Ss1 as the ON signal. Thus, when stopping generation of the control electric power by the power supply 5 during the OFF time period, the stopper 13 is to restart the generation of the control electric power by the power supply 5 immediately after the phase (zero crossing point) of the AC voltage Vac is detected by the phase detector 3. Note that during the second time period T2 from the first time point t1 to the second time point (switching time point) t2, the bidirectional switch 2 is in the ON state (bidirectionally ON state) and it is thus not possible to secure supplying of electric power from the AC power supply 8 to the power supply 5, and therefore, the power supply 5 does not generate the control electric power.

(1.3) Comparison with Comparative Example

In the following description, a lighting control device as a comparative example is assumed that has the same configuration as the present embodiment except that the stopper 13 is omitted (the power supply 5 is directly connected to the diodes D1 and D2 in the comparative example). The present embodiment and the comparative example are compared with each other, and differences between the present embodiment and the comparative example will be described. The comparative example described herein is different from the present embodiment in that the stopper is omitted, but other circuit configurations are the same as those in the present embodiment. Thus, elements similar to those in the present embodiment are given common reference signs for description.

In the comparative example, also during the time period (OFF time period) during which the bidirectional switch 2 is in the OFF state, the power supply 5 is supplied with electric power from the AC power supply 8 to generate the control electric power, and thus, a current may flow between the pair of input terminals 11 and 12 through the power supply 5. In other words, even when the bidirectional switch 2 is in the OFF state, the influence of the power supply 5 reduces the impedance between the input terminals 11 and 12. In this state, the AC voltage Vac of the AC power supply 8 is divided by the lighting control device and the load 7, and depending on the type of the load 7, a voltage applied between the pair of input terminals 11 and 12 may largely differ from the AC voltage Vac. Thus, in the comparative example, the phase detector 3 may not be able to accurately detect the phase (zero crossing point) of the AC voltage Vac. A low detection accuracy of the phase of the AC voltage Vac by the phase detector 3 may adversely affect control of the bidirectional switch 2 by the controller 6, and normal operation of the lighting control device may not be maintained.

In contrast, in the present embodiment, an impedance increased by disconnecting the power supply 5 from the input terminals 11 and 12 can be maintained between the input terminals 11 and 12 in a time period which is included in the OFF time period and during which the interruption signal Ss1 is the OFF signal. That is, the lighting control device 1 stops the generation of the control electric power by the power supply 5 during the time period (OFF time period) during which the bidirectional switch 2 is in the OFF state so as not to supply electric power from the AC power supply 8 to the power supply 5, so that it is possible to maintain a high impedance between the input terminals 11 and 12. In this state, the voltage applied between the pair of input terminals 11 and 12 is less likely to differ from the AC voltage Vac of the AC power supply 8. Thus, in the lighting control device 1 of the present embodiment, the detection accuracy of the phase (zero crossing point) of the AC voltage Vac by the phase detector 3 is higher than in the comparative example.

(1.4) Advantages

The lighting control device 1 of the present embodiment includes the stopper 13, and therefore, even during the time period (OFF time period) during which the bidirectional switch 2 is in the OFF state, the lighting control device 1 can stop the generation of the control electric power by the power supply 5 when or after the voltage (the voltage Vc2 of the capacitive element C2) of the control electric power reaches the threshold Vth1. Thus, the voltage applied between the pair of input terminals 11 and 12 is less likely to differ from the AC voltage Vac, and the detection accuracy of the phase of the AC voltage Vac by the phase detector 3 increases more than in the configuration without the stopper 13. When the detention accuracy of the phase of the AC voltage Vac by the phase detector 3 increases, it becomes easy to maintain normal operation of the lighting control device 1. Moreover, during the OFF time period, the power supply 5 generates the control electric power until the voltage of the control electric power reaches the threshold Vth1, and therefore, the lighting control device 1 can maintain supplying of power supply from the power supply 5 to the controller 6. Thus, it is possible to prevent anomalous operation such as blinking and flickering of the load 7. Thus, the lighting control device 1 of the present embodiment becomes compatible with an increased number of types of loads.

Moreover, examples of a control method of the lighting control device include a normal phase control method (leading edge method) in addition to a reverse phase control method (trailing edge method). The normal phase control method establishes conduction between the pair of input terminals 11 and 12 during a time period from a time point during the half period of the AC voltage Vac to the zero crossing point. In the reverse phase control method, the load 7 including an LED element serving as a light source is started to be supplied with electric power from the zero crossing point, and therefore, it is possible to reduce current waveform distortion at the start of the electric power supply. Thus, the number of loads 7 (lamps) connectable to the lighting control device increases, and the generation of a howling sound can be reduced.

While the lighting control device 1 of the present embodiment basically adopts the reverse phase control method, the load 7 is started to be supplied with electric power at the first time point (the generation time point of the first detection signal ZC1 or the second detection signal ZC2) t1 slightly later than the starting point (zero crossing point) t0 of the half period. Thus, the current waveform distortion may be larger than that in the reverse phase control method in which the load 7 is started to be supplied with electric power at the zero crossing point. However, the absolute value of the AC voltage Vac at the first time point t1 is not very large, and therefore, the influence of the current waveform distortion is negligibly small.

Moreover, the lighting control device 1 of the present embodiment retains the bidirectional switch 2 in the reverse ON state during the time period (third time period T3) from the second time point t2 to the third time point t3, and therefore, erroneous detections by the phase detector 3 can be reduced. That is, in some loads 7, the absolute value of the voltage across the loads 7 is higher than the absolute value of the AC voltage Vac, and as a result, a voltage having a polarity reverse to the polarity of the AC voltage Vac (hereinafter referred to as "reverse polarity voltage") may be applied to the pair of input terminals 11 and 12. For example, such a reverse polarity voltage is likely to be generated in a load 7 across which the voltage across is less likely to decrease, such as a load 7 including a buffer capacitor having relatively large capacitance. When the reverse polarity voltage is generated, the phase detector 3 may erroneously detect the zero crossing point at a point other than the zero crossing point of the AC voltage Vac. In some load 7, the reverse polarity voltage may or may not be generated depending on the dimming level, and in such loads 7, the zero crossing point may suddenly change when the dimming level changes. During the third time period T3, the bidirectional switch 2 is in the reverse ON state, and thus the generation of such reverse polarity voltages is reduced, and thus, erroneous detections by the phase detector 3 due to the reverse polarity voltage can be reduced.

Moreover, as described in the present embodiment, the power supply 5 preferably includes the capacitive element C2, and the voltage detector 53 is preferably configured to detect the voltage of the capacitive element C2. With this configuration, the power supply 5 can accumulate in the capacitive element C2 electric power supplied from the AC power supply 8 during a time period during which no conduction is established between the input terminal 11 and 12. Thus, also during the time period during which conduction is established between the input terminals 11 and 12, the power supply 5 can ensure the control electric power of the controller 6. Note that the capacitive elements C1 and C2 included in the power supply 5 is not an essential configuration of the lighting control device 1, and each of the capacitive elements C1 and C2 may accordingly be omitted. The capacitive elements C1 and C2 may be parasitic capacitances, and in such a case, separate capacitive elements are not provided.

Moreover, as described in the present embodiment, the stopper 13 is preferably configured to restart generation of the control electric power by the power supply 5 after the phase of the AC voltage Vac is detected by the phase detector 3 when the generation of the control electric power by the power supply 5 is stopped during the OFF time period. In the present embodiment, the controller 6 sets the interruption signal Ss1 to the ON signal at the first time point (generation time point of the first detection signal ZC1 or the second detection signal ZC2) t1. Thus, the generation of the control electric power by the power supply 5 is restarted immediately after the phase of the AC voltage Vac is detected by the phase detector 3. With this configuration, also when the generation of the control electric power by the power supply 5 is stopped once, the power supply 5 restarts generating the control electric power during the next OFF time period, and therefore, the lighting control device 1 can maintain supplying of power supply from the power supply 5 to the controller 6. Note that it is not an essential configuration for the lighting control device 1 that when the stopper 13 halts the generation of the control electric power during the OFF time period, the generation of the control electric power is restarted immediately after the detection of the phase of the AC voltage Vac by the phase detector 3. When the stopper 13 halts the generation of the control electric power during the OFF time period, the generation of the control electric power by the power supply 5 may be restarted, for example, after the next OFF time period is started (after the switching time point).

As described in the present embodiment, the phase detector 3 is preferably configured to output the detection signal when the phase detector 3 detects a zero crossing point of the AC voltage Vac. With this configuration, during the OFF time period from the switching time point (second time point t2) to the end time point t4 of the half period, when or after the voltage (the voltage Vc2 of the capacitive element C2) of the control electric power reaches the threshold Vth1, the stopper 13 operates, thereby improving the detection accuracy of the zero crossing point by the phase detector 3. Thus, it is particularly useful to include the stopper 13 as in the lighting control device 1 of the present embodiment. Note that detecting the zero crossing point of the AC voltage Vac by the phase detector 3 is not an essential configuration of the lighting control device 1, and the phase detector 3 may detect the phase of the AC voltage Vac at a point other than the zero crossing point.

Moreover, as described in the present embodiment, the controller 6 is preferably configured to switch the bidirectional switch 2 from the OFF state to the ON state when the controller 6 receives the detection signal. With this configuration, the controller 6 can switch the bidirectional switch 2 from the OFF state to the ON state immediately after the phase detector 3 detects the zero crossing point of the AC voltage Vac. In this case, the detection accuracy of the zero crossing point by the phase detector 3 is important for reliable control of the bidirectional switch 2. Thus, it is particularly useful to include the stopper 13 as in the lighting control device 1 of the present embodiment. Note that it is not an essential configuration of the lighting control device 1 that the controller 6 receives the detection signal to switch the bidirectional switch 2 from the OFF state to the ON state.

(1.5) Variation (1.5.1) First Variation

Figure 3:
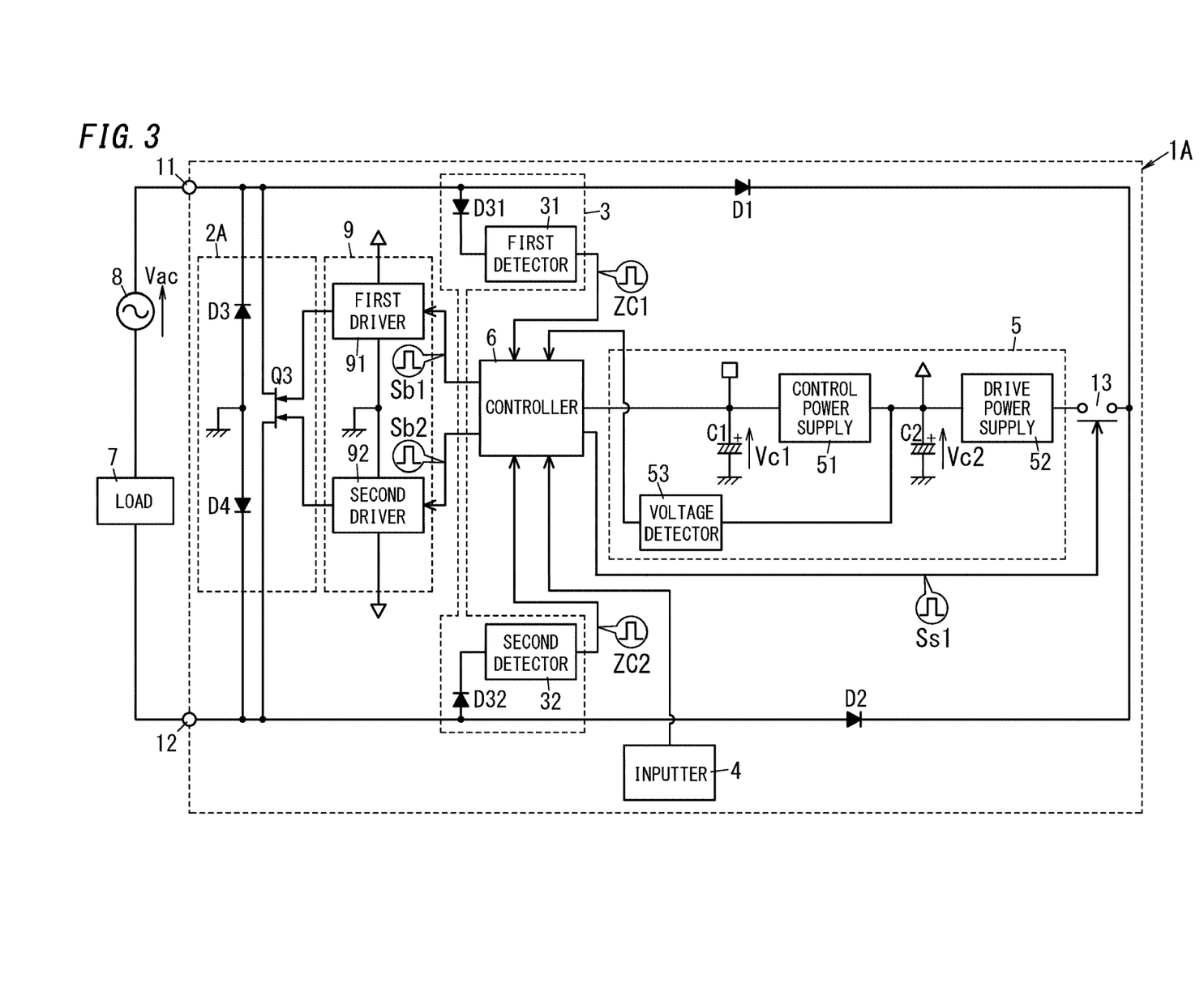
FIG. 3 is a circuit diagram schematically illustrating a configuration of a lighting control device according to a first variation of the first embodiment.

As illustrated in FIG. 3, a bidirectional switch 2A of a lighting control device 1A according to a first variation of the first embodiment is different from the bidirectional switch 2 of the lighting control device 1 of the first embodiment. Components similar to those in the first embodiment are hereinafter denoted by the same reference signs as those in the first embodiment, and the description thereof will be omitted accordingly.

In the present variation, the bidirectional switch 2A includes a switching device Q3 having a double gate structure. The switching device Q3 is a semiconductor element having a double gate (dual gate) structure including a semiconductor material of a wide band gap such as gallium nitride (GaN). Moreover, the bidirectional switch 2A includes a pair of diodes D3 and D4 connected to each other in a so-called anti-series connection between input terminals 11 and 12. The cathode of the diode D3 is connected to the input terminal 11, and the cathode of the diode D4 is connected to the input terminal 12. The anodes of both the diodes D3 and D4 are electrically connected to ground of a power supply 5. In the present variation, the pair of diodes D3 and D4 and a pair of diodes D1 and D2 together form a diode bridge.

According to the configuration of the present variation, the bidirectional switch 2A can reduce the conduction loss more than the bidirectional switch 2.

(1.5.2) Other Variations

Variations of the first embodiment other than the above-described first variation will be mentioned below.

The lighting control device of each of the first embodiment and the first variation is applicable not only to the load 7 using an LED device as a light source but also to a light source including a capacitor input-type circuit, having a high impedance, and being lit with a small current. Examples of such a light source include an organic electroluminescence (EL) element. Moreover, the lighting control device is applicable to loads 7 of various light sources such as a discharge lamp.

The bidirectional switch 2 can be controlled so as to be in a forward ON state instead of the bidirectionally ON state, or the bidirectional switch 2 can be controlled so as to be in the bidirectionally ON state instead of the forward ON state. Moreover, the bidirectional switch 2 can be controlled so as to be in the reverse ON state instead of the bidirectionally OFF state, or the bidirectional switch 2 can be controlled so as to be in the bidirectionally OFF state instead of the reverse ON state. That is, it is only required that the ON state or the OFF state of the bidirectional switch 2 is not changed from the states described in the above description.

Moreover, a control method of the bidirectional switch 2 by the controller 6 is not limited to the above-described examples and may be, for example, a method for alternately setting the first control signal and the second control signal to the ON signal at the same cycle as the AC voltage Vac. In this case, the bidirectional switch 2 is conductive during a time period during which one of the switching devices Q1 and Q2 corresponding to a high-potential side of the AC voltage Vac is on. That is, this variation realizes so-called reverse phase control for establishing conduction between the pair of input terminals 11 and 12 during a time period from the zero crossing point of the AC voltage Vac to a time point during the half period. In this case, a phase difference between the first control signal and the AC voltage Vac and a phase difference between the second control signal and the AC voltage Vac are controlled to adjust the conduction time of the bidirectional switch 2.

As long as the stopper 13 is configured to stop the generation of the control electric power by the power supply 5 when the voltage Vc2 detected by the voltage detector 53 is higher than or equal to the threshold Vth1 during the OFF time period, it is not an essential configuration that the stopper 13 is controlled by the interruption signal Ss1 from the controller 6. For example, the stopper 13 has a function of comparing the detection value of the voltage detector 53 with the threshold Vth1, and based on the comparison result, the stopper 13 may stop the generation of the control electric power by the power supply 5.

The voltage detector 53 is not necessarily disposed in the power supply 5 but may be disposed in, for example, the controller 6. In this case, for example, when the capacitive element C2 is connected to an A/D conversion input terminal of the controller 6, the voltage Vc2 of the capacitive element C2 is input as an analog value to the controller 6.

Moreover, the control method of the bidirectional switch 2 is not limited to the reverse phase control method (trailing edge method) but may be a normal phase control method (leading edge method).

When the control method of the bidirectional switch 2 is a normal phase control method, the controller 6 turns on the bidirectional switch 2 at a time point when the OFF time having a length according to the dimming signal elapses from the starting point (zero crossing point) of the half period during the half period of the AC voltage Vac. Moreover, the controller 6 turns off the bidirectional switch 2 at a time point when a time obtained by subtracting a definite time period from the time of the half period elapses from the starting point of the half period. That is, in the normal phase control method, the bidirectional switch 2 is in the on state from a time point when the OFF time corresponding to the dimming signal elapses from the starting point of the half period of the AC voltage Vac until immediately before the end time point (zero crossing point) of the half period. In other words, the bidirectional switch 2 is in the off state during a time period from a point immediately before the zero crossing point of the AC voltage Vac to a time point when a time obtained by adding a definite time period to the OFF time having a length according to the dimming signal elapses.

Also in this case, the controller 6 compares the voltage Vc2 of the capacitive element C2 with the threshold Vth1 during the OFF time period during which the bidirectional switch 2 is in the OFF state, and when the voltage Vc2 is higher than or equal to the threshold Vth1, the controller 6 switches the interruption signal Ss1 from the ON signal to the OFF signal. After switching the interruption signal Ss1 to the OFF signal, the controller 6 retains the interruption signal Ss1 as the OFF signal at least until a time point at which the bidirectional switch 2 next transitions to the ON state (a time point when an OFF time corresponding to the dimming signal elapses from the starting point of the half period of the AC voltage Vac). While the interruption signal Ss1 is the OFF signal, the stopper 13 halts the generation of the drive electric power by the drive power supply 52 of the power supply 5, thereby indirectly stopping the generation of the control electric power by the control power supply 51.

Moreover, the switch driver 9 is not an essential configuration of the lighting control device 1 and may thus accordingly be omitted. When the switch driver 9 is omitted, the controller 6 directly drives the bidirectional switch 2. When the switch driver 9 is omitted, the drive power supply 52 is omitted.

Moreover, each of the switching devices Q1 and Q2 included in the bidirectional switch 2 is not limited to an enhancement n-channel MOSFET but may be, for example, an insulated gate bipolar transistor (IGBT). Moreover, in the bidirectional switch 2, rectifier elements (the diodes) for realizing the unidirectionally on state are not limited to the parasitic diodes of the switching devices Q1 and Q2 but may be external diodes such as those described in the first variation. The diode may be accommodated in an identical package with each of the switching devices Q1 and Q2.

Moreover, the first time point t1 is not limited to the generation time point of the first detection signal ZC1 or the second detection signal ZC2 but may be a time point when a defined delay time (e.g., 300 μs) elapses from the generation time point of the first detection signal ZC1 or the second detection signal ZC2. The delay time is not limited to 300 μs but may be accordingly determined within a range from 0 μs to 500 μs.

Moreover, the third time point t3 is required only to be before the end time point (zero crossing point) t4 of the half period, and the length from the third time point t3 to the end time point t4 of the half period can be accordingly determined. For example, when the time length from the first time point t1 to the third time point t3 is shorter than the half period by a certain specified time, the specified time is not limited to 300 μs but may be accordingly set to a value within a range from 100 μs to 500 μs.

Moreover, the stopper 13 is required only to be configured to stop the generation of the control electric power by the power supply 5 during a stop time period. Thus, the configuration of the stopper 13 is not limited to a configuration in which at least one of the pair of input terminals 11 and 12 is electrically disconnected from the power supply 5 or a semiconductor switching device included in the power supply 5 is controlled to halt the generation of the control electric power by the power supply 5. For example, the stopper 13 may be configured to halt an output (output of control electric power) of the power supply 5 to increase the input impedance of the power supply 5, thereby stopping the generation of the control electric power by the power supply 5.

Figure 4:
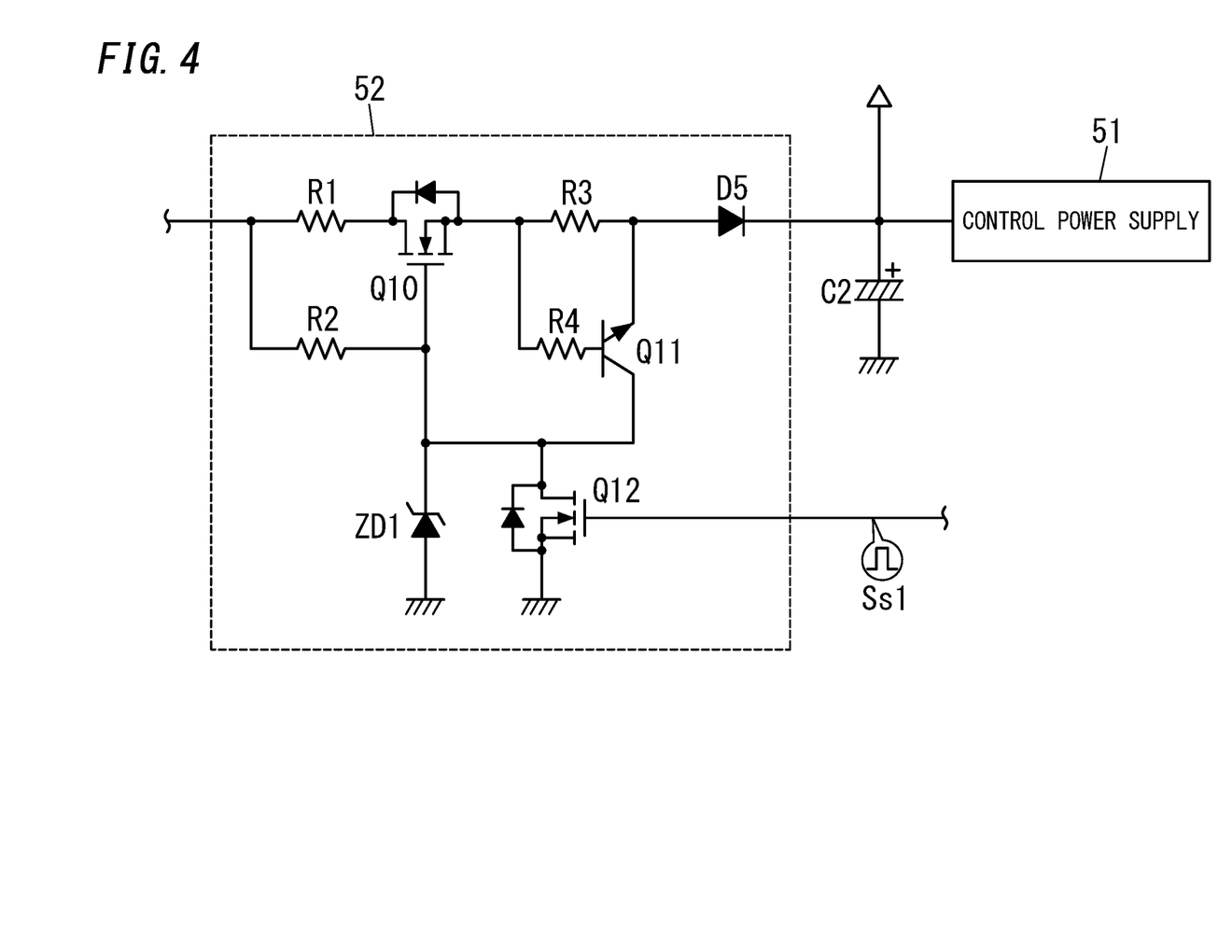
FIG. 4 is a circuit diagram schematically illustrating a configuration of a power supply of a lighting control device according to another variation of the first embodiment.

FIG. 4 shows an example of a configuration configured to halt generation of the control electric power by the power supply 5. In this configuration, the drive power source 52 also serves as a stopper. The drive power supply 52 forms a constant voltage circuit including a Zener diode ZD1 and a transistor Q10. In FIG. 4, the drive power supply 52 includes the Zener diode ZD1, the transistor Q10, a resistor R1 (first resistor R1), a resistor R2 (second resistor R2), and a diode D5. The drive power supply 52 further includes a resistor R3 (third resistor R3), a fourth resistor R4, a third switching device Q11, and a fourth switching device Q12. In FIG. 4, the right and left sides of FIG. 1 are reversed, and the drive power supply 52 is located on the left of the control power supply 51.

Specifically, the resistor R1, the transistor Q10, the resistor R3, the diode D5, and the capacitive element C2 are electrically connected in series between the power supply input terminal (the connection point of the pair of diodes D1 and D2) and ground. The resistor R2 and the Zener diode ZD1 are electrically connected in series between the power supply input terminal and ground. Each of the transistor Q10 and the switching device Q12 includes, for example, an enhancement n-channel MOSFET. The switching device Q11 includes, for example, an npn-bipolar transistor.

The transistor Q10 has a gate electrically connected to the cathode of the Zener diode ZD1. The Zener diode ZD1 has an anode electrically connected to ground. The switching device Q11 is electrically connected between the source and the gate of the transistor Q10. The switching device Q11 has an emitter electrically connected to the source of the transistor Q10 via the resistor R3. The switching device Q11 has a base electrically connected to the source of the transistor Q10 via the resistor R4. The switching device Q12 is electrically connected between the gate of the transistor Q10 and the ground. The switching device Q12 has a gate electrically connected to the controller 6. The switching device Q12 receives an interruption signal Ss1 from the controller 6 to be turned on and off.

With this configuration, while the interruption signal Ss1 from the controller 6 is the OFF signal (e.g., a low level), the drive power supply 52 is supplied with electric power from the AC power supply 8 to charge the capacitive element C2 with a constant voltage based on the Zener voltage (breakdown voltage) of the Zener diode ZD1. A voltage between the gate of the transistor Q10 and the ground is clamped to the Zener voltage of the Zener diode ZD1. In this embodiment, when the value of a current (drain current) flowing through the transistor Q10 becomes larger than or equal to a specified value, a voltage across the resistor R3 turns on the switching device Q11, thereby turning off the transistor Q10. At this time, the charging path of the capacitive element C2 is interrupted, so that the power supply 5 stops generating the control electric power. That is, when the charging path of the capacitive element C2 is interrupted, the voltage of the capacitive element C2 only decreases, and therefore, the voltage of the capacitive element C2 decreases below a voltage at which the control power supply 51 can operate, so that the control power supply 51 stops generating the control electric power.

On the other hand, when the interruption signal Ss1 from the controller 6 transitions to the ON signal (e.g., a high level), the switching device Q12 is turned on, thereby turning off the transistor Q10. At this time, the charging path of the capacitive element C2 is interrupted, thereby stopping the generation of the control electric power by the power supply 5. That is, in the example shown in FIG. 4, the stopper (drive power supply 52) halts the output of the control electric power while the interruption signal Ss1 is the ON signal.

The diodes D1 and D2 in the first embodiment are not essential components of the lighting control device 1, and the diodes D1 and D2 may thus accordingly be omitted.

Moreover, in comparison between two values, for example, in relation to the AC voltage Vac and the specified value Vzc, "larger than or equal to" includes both a case where the two values are equal to each other and a case where one of the two values is larger than the other of the two values. However, the meaning of the "larger (higher) than or equal to" mentioned herein is not limited to the above definition but "larger (higher) than or equal to" mentioned herein may be a synonym of "larger (higher) than" which includes only a case where one of the two values is larger than the other of the two values. That is, whether or not a case where the two values are equal to each other is included can be arbitrarily changed depending on the setting of the specified value Vzc and the like, and therefore, there is no technical difference between "larger (higher) than or equal to" and "larger (higher) than". Similarly, "lower than" may be a synonym of "lower than or equal to".

Second Embodiment

Figure 5:
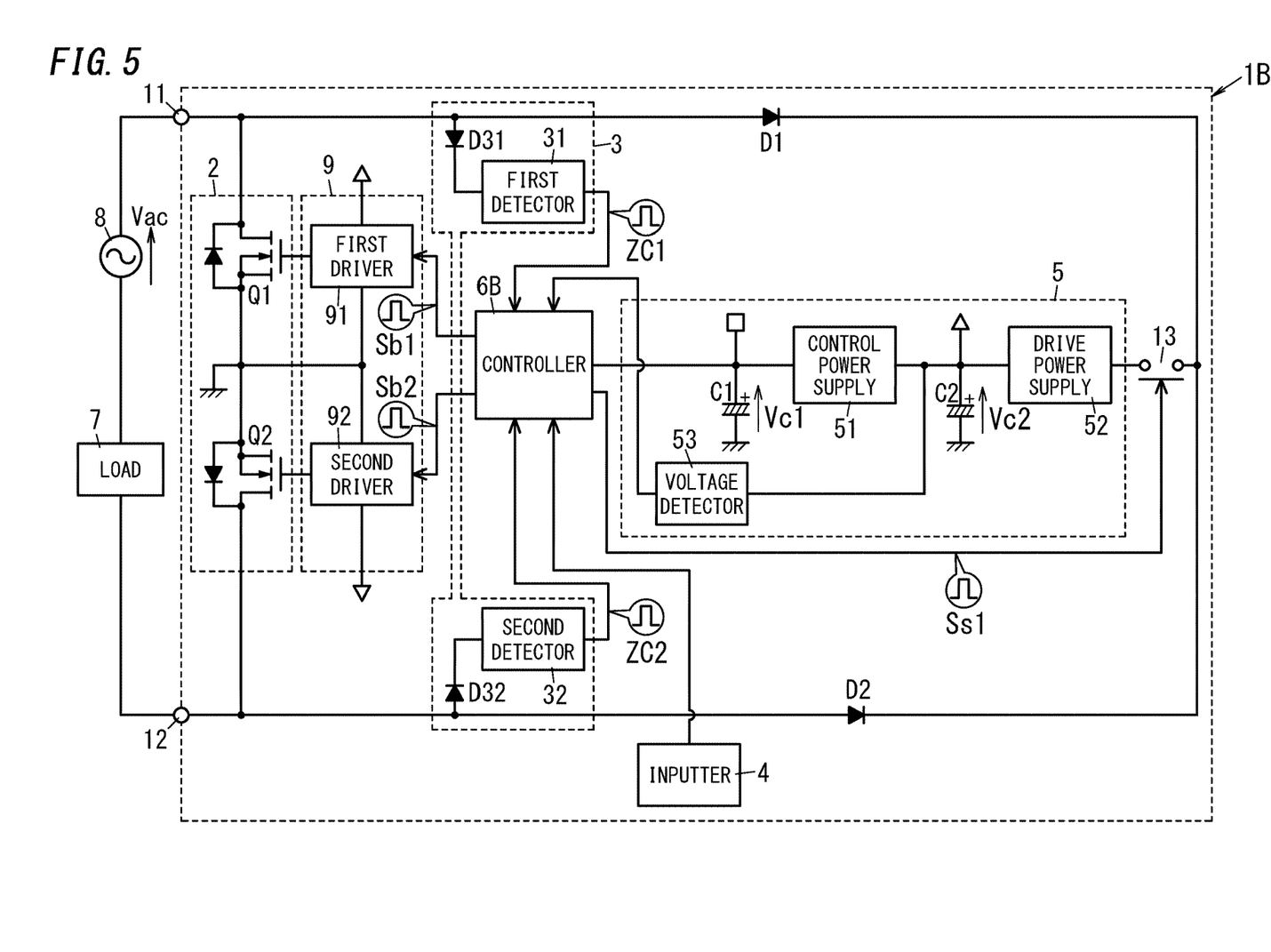
FIG. 5 is a circuit diagram schematically illustrating a configuration of a lighting control device according to a second embodiment.

As illustrated in FIG. 5, a lighting control device 1B of a second embodiment is different from the lighting control device 1 of the first embodiment in that a controller 6B is configured to estimate a zero crossing point of an AC voltage Vac of at least one half period ahead in future in accordance with a detection signal of a zero crossing point for one time. The circuit configuration of the lighting control device 1B is the same as that of the lighting control device 1 of the first embodiment. Components similar to the components of the first embodiment will be hereinafter denoted by the same reference signs as those in the first embodiment, and the description thereof will be omitted.

The second embodiment is similar to the first embodiment in that a phase detector 3 is configured to output a detection signal when the phase detector 3 detects the zero crossing point of the AC voltage Vac.

Figure 6:
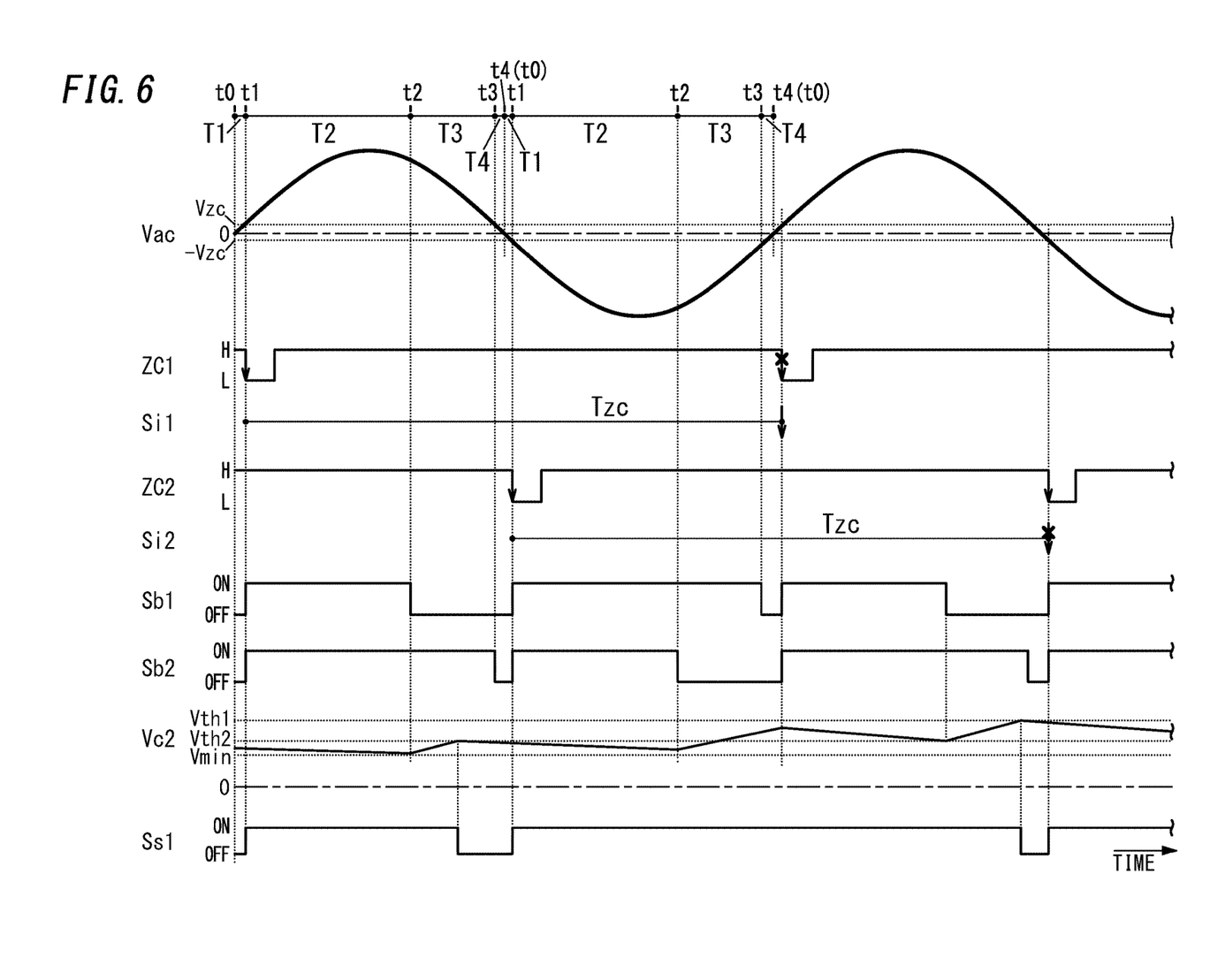
FIG. 6 is a timing chart illustrating operation of the lighting control device according to the second embodiment.

In the present embodiment, the controller 6B estimates, based on the frequency of the AC voltage Vac, a zero crossing point of the AC voltage Vac of at least half period ahead in future as a virtual zero crossing point each time the controller 6B receives the detection signal from the phase detector 3, and the controller 6B generates a virtual signal at the timing of the virtual zero crossing point. Specifically, as illustrated in FIG. 6, the controller 6B generates a first virtual signal Si1 at a time point when a stand-by time Tzc corresponding to one period of the AC voltage Vac elapses from a time at which the controller 6B receives a first detection signal ZC1. Similarly, the controller 6B generates a second virtual signal Si2 at a time point when the stand-by time Tzc corresponding to the one period of the AC voltage Vac elapses from a time point at which the controller 6B receives a second detection signal ZC2. FIG. 6 shows the AC voltage Vac, the first detection signal ZC1, the second detection signal ZC2, a first control signal Sb1, a second control signal Sb2, the voltage Vc2, and the interruption signal Ss1 which are similar to those of FIG. 2. FIG. 6 further shows the first virtual signal Si1 and the second virtual signal Si2.

In this embodiment, to prevent generation of the first virtual signal Si1 earlier than a next first detection signal ZC1, the stand-by time Tzc is set slightly longer than the one period of the AC voltage Vac. Moreover, to prevent generation of the second virtual signal Si2 earlier than a next second detection signal ZC2, the stand-by time Tzc is set a little longer than the one period of the AC voltage Vac.

The controller 6B uses the logical disjunction of the first detection signal ZC1 and the first virtual signal Si1 as a trigger signal for determining a timing for controlling a bidirectional switch 2. Similarly, the controller 6B uses the logical disjunction of the second detection signal ZC2 and the second virtual signal Si2 as a trigger signal for determining a timing for controlling the bidirectional switch 2. Thus, even when the phase detector 3 fails to detect the zero crossing point, the controller 6B can determine a timing for controlling the bidirectional switch 2 by using the virtual signal generated at the virtual zero crossing point as the trigger signal instead of the detection signal from the phase detector 3.

The controller 6B may be configured to estimate the virtual zero crossing point for two or more times in response to the detection signal of the zero crossing point for one time. In this case, the controller 6B generates a virtual signal every lapse of the stand-by time Tzc from a time point at which the controller 6B receives the detection signal.

Moreover, the stand-by time Tzc for generating the virtual signal is at least determined with reference to the half period of the AC voltage Vac. The stand-by time Tzc may be determined with reference to the half period, three times the half period, four times the half period, or more times other than the one time period. Three times the half period equals 1.5 periods, and four times the half period equals 2 periods. When the stand-by time Tzc is determined with reference to a period of an odd multiple of the half period, the controller 6B generates the second virtual signal Si2 at a time point when the stand-by time Tzc elapses based on the first detection signal ZC1. Moreover, in this case, the controller 6B generates the first virtual signal Si1 at a time point when the stand-by time Tzc based on the second detection signal ZC2 elapses. Thus, the controller 6B may be configured to generate the first virtual signal Si1 and the second virtual signal Si2 based on only one of the first detection signal ZC1 and the second detection signal ZC2.

The lighting control device 1B of the present embodiment includes the controller 6B configured to estimate a zero crossing point of the AC voltage Vac of at least the half period ahead in future based on the detection signal for one time. Thus, even when the phase detector 3 cannot detect a zero crossing point due to the influence of accidental noise and the like, or even when the zero crossing point is shifted due to an instantaneous drop of the AC voltage Vac or the like, the controller 6B stably performs reverse phase control in synchrony with the period of the AC voltage Vac. For example, when the light output of the load 7 is increased, the variable time is increased, the voltage Vc2 of the control power source does not reach the threshold Vth1 during the OFF period, and the power source 5 may continue generating the control electric power also at the zero crossing point of the AC voltage Vac. In such a case, even when the phase detector 3 fails to detect the zero crossing point, the controller 6B can stably perform reverse phase control in synchrony with the period of the AC voltage Vac with reference to the virtual zero crossing point.

In the present embodiment, as illustrated in FIG. 6, two values, namely the first threshold Vth1 and the second threshold Vth2 are set as thresholds with which the voltage Vc2 is compared. For example, the second threshold Vth2 is larger than the minimum value V min, and the first threshold Vth1 is larger than the second threshold Vth2 (V min<Vth2<Vth1). This embodiment adopts, as the second threshold Vth2, a value obtained by adding a prescribed margin to the minimum value V min so that the voltage Vc2 of the capacitive element C2 is not smaller than the minimum value V min in any dimming level.

The controller 6B uses the first threshold Vth1 or the second threshold Vth2 depending on the reception state of the detection signal (first detection signal ZC1 or second detection signal ZC2) from the phase detector 3. Specifically, the controller 6B uses the first threshold Vth1 during a time period (while the stand-by time Tzc is counted) from a time point at which the detection signal from the phase detector 3 is normally received to a time point at which the stand-by time Tzc corresponding to the one time period of the AC voltage Vac elapses. The controller 6B use the second threshold Vth2 during a period other than the stand-by time Tzc is counted.

Thus, as illustrated in FIG. 6, the controller 6B switches the interruption signal Ss1 to be output to the stopper 13 from the ON signal to the OFF signal if the voltage Vc2 is higher than or equal to the first threshold Vth1 while the stand-by time Tzc is counted. Thus, while the stand-by time Tzc is counted, the power supply 5 does not stop generating the control electric power until the voltage Vc2 reaches the first threshold Vth1 even when the voltage Vc2 is higher than or equal to the second threshold Vth2. On the other hand, during a period except for the period during which the stand-by time Tzc is counted, the controller 6B switches the interruption signal Ss1 to be output to the stopper 13 from the ON signal to the OFF signal when the voltage Vc2 is equal to or higher than the second threshold Vth2. Thus, during the time period except for the period during which the stand-by time Tzc is counted, the power supply 5 stops generating the control electric power at a time point at which the voltage Vc2 reaches the second threshold Vth2.

According to the configuration described above, while the stand-by time Tzc is counted, the larger threshold (first threshold Vth1) is adopted as a threshold for stopping the generation of the control electric power, so that securing of the control electric power is prioritized more than the detection accuracy of the zero crossing point. That is, in this state, even if the phase detector 3 failed to detect the zero crossing point of the AC voltage Vac, the controller 6B can continue stably performing the reverse phase control with reference to the virtual zero crossing point, and thus, it is desirable to give a priority to ensuring the control electric power. On the other hand, during the time period except for the time period during which the stand-by time Tzc is counted, the smaller threshold (second threshold Vth2) is adopted as a threshold for stopping the generation of the control electric power. Thus, the stopper 13 operates, and it becomes easy to improve the detection accuracy of the phase of the AC voltage Vac by the phase detector 3. That is, in this state, if the phase detector 3 fails to detect the zero crossing point of the AC voltage Vac, the controller 6B may not be able to continue stably performing the reverse phase control, and therefore it is desirable to give a priority to the detection accuracy of the zero crossing point while securing the control electric power is limited to a necessary minimum.

Other configurations and functions are similar to those of first embodiment. The components of the present embodiment can be used in combination with each component described in the first embodiment (including variations).

Other Embodiment

In each of the first embodiment (including the variations) and the second embodiment, supplying electric power from the AC power supply 8 to the power supply 5 is secured (during the third time period T3 and the fourth time period T4) before the start time point (zero crossing point) t0 of the half period of the AC voltage Vac, but the above-described embodiments are not limited to this configuration.

Supplying electric power from the AC power supply 8 to the power supply 5 may be secured for a definite time (during the first time period T1) after the start time point (zero crossing point) t0 of the half time period of the AC voltage Vac. Moreover, during periods (the first time period T1, the third time period T3, and the fourth time period T4) before and after the starting point (zero crossing point) t0 of the half period of the AC voltage Vac, supplying electric power from the AC power supply 8 to the power supply 5 may be secured for a definite time. That is, supplying electric power from the AC power supply 8 to the power supply 5 can be secured during any of the first time period T1, the third time period T3, and the fourth time period T4. Note that when a user manipulates the manipulation section so as to maximize the light output of the load 7, priority is given to securing the first time period T1, the third time period T3, and the fourth time period T4, and the second time period T2 may be controlled to be a time period shorter than a length at which the light output is maximized.

Determining the definite time so as to sufficiently supply electric power from the AC power supply 8 to the power supply 5 enables the controller 6 to stably operate while waveform distortion is reduced.

REFERENCE SIGNS LIST 1, 1A, 1B Lighting Control Device
2, 2A Bidirectional Switch
3 Phase Detector
4 Inputter
5 Power Supply
6, 6B Controller
7 Load (Illumination Load)
8 AC Power Supply
11 Input Terminal
12 Input Terminal
13 Stopper
53 Voltage Detector
C2 Capacitive Element
T0 Starting Point (Zero Crossing Point) of Half Period
T2 Second Time Point (Switching Time Point)
T4 End Time Point (Zero Crossing Point) of Half Period
Vac AC Voltage
Vc2 Voltage (of Control Electric Power)
Vth1, Vth2 Threshold
ZC1 First Detection Signal
ZC2 Second Detection Signal

The invention claimed is:

1. A lighting control device, comprising:
a pair of input terminals electrically connected between an illumination load and an AC power supply;
a bidirectional switch configured to switch between conduction and non-conduction of a bidirectional current between the pair of input terminals;
a phase detector configured to detect a phase of an AC voltage of the AC power supply;
an inputter configured to receive a dimming level specifying a magnitude of a light output of the illumination load;
a power supply electrically connected between the pair of input terminals and configured to be supplied with electric power from the AC power supply to generate control electric power;
a voltage detector configured to detect a voltage of the control electric power;
a controller configured to be supplied with the control electric power from the power supply to operate and to control the bidirectional switch based on a detection signal from the phase detector so as to switch the bidirectional switch from an ON state to an OFF state at a switching time point when a variable time corresponding to the dimming level elapses from a starting point of a half period of the AC voltage; and
a stopper configured to halt generation of the control electric power by the power supply when the voltage detected by the voltage detector is higher than or equal to a prescribed threshold during an OFF time period from the switching time point to an end time point of the half period, wherein
the stopper is configured to restart generation of the control electric power by the power supply after a phase of the AC voltage is detected by the phase detector when the generation of the control electric power by the power supply is stopped during the OFF time period.

2. The lighting control device according to claim 1, wherein
the power supply includes a capacitive element, and
the voltage detector is configured to detect a voltage of the capacitive element.

3. The lighting control device according to claim 1, wherein
the phase detector is configured to output the detection signal when the phase detector detects a zero crossing point of the AC voltage.

4. The lighting control device according to claim 3, wherein
the controller is configured to switch the bidirectional switch from the OFF state to the ON state when the controller receives the detection signal.

5. The lighting control device according to claim 3, wherein
the controller is configured to estimate a zero crossing point of the AC voltage of at least the half period ahead in future based on the detection signal for one time.

6. The lighting control device according to claim 2, wherein
the phase detector is configured to output the detection signal when the phase detector detects a zero crossing point of the AC voltage.

7. The lighting control device according to claim 6, wherein
the controller is configured to switch the bidirectional switch from the OFF state to the ON state when the controller receives the detection signal.

8. The lighting control device according to claim 4, wherein
the controller is configured to estimate a zero crossing point of the AC voltage of at least the half period ahead in future based on the detection signal for one time.

9. The lighting control device according to claim 6, wherein
the controller is configured to estimate a zero crossing point of the AC voltage of at least the half period ahead in future based on the detection signal for one time.

10. The lighting control device according to claim 7, wherein
the controller is configured to estimate a zero crossing point of the AC voltage of at least the half period ahead in future based on the detection signal for one time.

* * * * *